(12) United States Patent
Yeh et al.

(10) Patent No.: US 12,348,359 B2
(45) Date of Patent: Jul. 1, 2025

(54) LOCAL AUTOMATION ENGINE IN DISTRIBUTED ENVIRONMENT

(71) Applicant: Google LLC, Mountain View, CA (US)

(72) Inventors: Jung-Yu Yeh, Mountain View, CA (US); Kenneth Mackay, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/465,275

(22) Filed: Sep. 12, 2023

(65) Prior Publication Data

US 2025/0088412 A1   Mar. 13, 2025

(51) Int. Cl.
*H04L 41/0663* (2022.01)
*H04L 12/28* (2006.01)

(52) U.S. Cl.
CPC ...... *H04L 41/0663* (2013.01); *H04L 12/2825* (2013.01); *H04L 12/2832* (2013.01)

(58) Field of Classification Search
CPC ............. H04L 41/0663; H04L 12/2825; H04L 12/2832
See application file for complete search history.

(56) References Cited

U.S. PATENT DOCUMENTS

| | | | | |
|---|---|---|---|---|
| 11,397,798 | B2 * | 7/2022 | Lazzaro | G06F 21/316 |
| 2021/0224051 | A1 * | 7/2021 | Bequet | G06F 9/45533 |
| 2022/0365868 | A1 * | 11/2022 | Rao | H04L 43/50 |
| 2024/0193066 | A1 * | 6/2024 | Sood | G06F 11/3409 |

OTHER PUBLICATIONS

Calvo et al., "Remote Attestation as a Service for Edge-Enabled IoT", IEEE International Conference on Servivces Computing, IEEE Pbblishing, Sep. 5, 2021.*
Peng et al, "BOAT: A Block-Streaming App Execution Scheme for Lightweight IoT Devices", IEEE Internet of Things Journal, vol. 5, Issue:3, IEEE Publishing , Jun. 29, 2018.*

* cited by examiner

*Primary Examiner* — Todd L Barker
(74) *Attorney, Agent, or Firm* — Kilpatrick Townsend & Stockton LLP

(57) ABSTRACT

Local execution of smart device mesh automations with cloud-based failover is described herein. Embodiments operate in context of network-connected devices in a smart device mesh with a local automation system, where all devices communicate with cloud-based automation, and at least some also communicate with local automation. A determination is made whether to claim each automation routine for local automation, or to automatically execute the automation by the cloud when triggered. Triggered locally claimed automation routines cause attempted default execution locally by local automation with automatic failover execution by the cloud-based automation. Some embodiments further involve electing an executor device as part of claiming an automation routine and/or monitoring execution of automation routines to determine when to automatically de-claim locally claimed automation routines with poor local execution success rates.

21 Claims, 7 Drawing Sheets

LOCAL AUTOMATION ENGINE IN DISTRIBUTED ENVIRONMENT

BACKGROUND

Network-connected devices are becoming increasingly prevalent. Many consumers have, in their homes and/or offices, smart hubs, smart speakers, smart televisions, smart refrigerators, smart thermostats, smart lighting, and/or many other types of network-connected devices, including sensors, appliances, etc. Some systems are connected to form a smart device mesh (e.g., a smart home mesh), in which functions of the network-connected devices can be controlled via hub devices and/or automatically in response to detected events. For example, a consumer may configure her smart device mesh to change the lighting in a room in response to a hub appliance receiving her voice commands, or automatically in response to a sensor detecting her presence in the room.

Some smart device mesh systems allow consumers to configure automations involving their network-connected devices. Such automations can conventionally be stored in cloud storage and executed by cloud computing resources. For example, all of the network-connected devices in a consumer's premises are in communication with a cloud-based automation system. A consumer has previously programmed an automation to change living room lighting automatically when she enters the room. The consumer enters her living room, a triggered presence detection sensor in the room sends an automation request message up to the cloud-based automation system, the cloud-based automation system searches for the relevant automation and computes a corresponding automation response message, and the cloud-based automation system sends the automation response message back down to the appropriate network-connected living room lighting to cause the lighting to change in the pre-programmed manner.

Such cloud-based implementations tend to provide robust, scalable, dynamic, effective, and otherwise feature-rich approaches to smart device mesh automation. However, such approaches can also tend to be limited because of their reliance on the performance of the cloud computing resources and connection links therewith. For example, responsiveness of such automations are limited to the round-trip times of the communication links between the consumer premises and the cloud, and such automations are unavailable when those communication links are not functioning.

SUMMARY

Systems and methods are described for local execution of smart device mesh automations with cloud-based failover. Embodiments operate in context of a consumer premises having several network-connected devices configured in a smart device mesh with a local automation system (e.g., implemented by at least one hub device). All the devices are in communication with a cloud-based automation system, and at least some of the devices are also in communication with the local automation system. When an automation routine is configured for the devices, a determination is made whether to locally claim the automation routine by the local automation system. Automation routines that are not locally claimed are executed automatically by the cloud-based automation system when triggered. For automation routines that are locally claimed, triggering causes attempted default execution by the local automation system with failover execution of the automation routine by the cloud-based automation system automatically in the event of failure of the default execution. Some embodiments further involve electing an executor device as part of claiming an automation routine and/or monitoring execution of automation routines to determine when to automatically de-claim locally claimed automation routines with poor local execution success rates.

According to one set of embodiments, a method is provided for selective local execution of automation routines. The method can be performed in context of a smart device mesh having a local automation system and a plurality of devices disposed in a consumer premises and communicatively coupled with a cloud-based automation system. The method includes: obtaining, by the local automation system, an automation routine that defines control of at least a second device of the plurality of devices automatically in response to detection of an associated trigger condition by at least a first device of the plurality of devices; determining, by the local automation system, whether the automation routine is locally claimable, such that the automation routine is executable by the local automation system; and claiming the automation routine by the local automation system responsive to determining that the automation routine is locally claimable, the claiming comprising tagging the automation routine as locally claimed both at the local automation system and at the cloud-based automation system, such that detection of the associated trigger condition by at least the first device causes a trigger message to be issued both to the local automation system and to the cloud-based automation system for default execution of the automation routine by the local automation system and for failover execution of the automation routine by the cloud-based automation system automatically in the event of failure of the default execution.

According to another set of embodiments, another method is provided. The method operates in context of a smart device mesh having a plurality of devices disposed in a consumer premises and communicatively coupled with a cloud-based automation system via a non-local network, at least some of the plurality of devices being dual-connected devices that are further communicatively coupled with a local automation system via a local area network (LAN) of the consumer premises. The method includes: receiving, by the cloud-based automation system, a first indication of detection of a first trigger condition and a second indication of detection of a second trigger condition; identifying a first automation routine as triggered by the first trigger condition and a second automation routine as triggered by the second trigger condition, the first and second automation routines previously stored in cloud-based storage of the cloud-based automation system; and determining that the first automation routine is tagged as locally claimed and that the second automation routine is not tagged as locally claimed. Responsive to the determining, the method further includes: commencing execution of the second automation routine by the cloud-based automation system, responsive to the determining that the second automation routine is not tagged as locally claimed, by communicating control messages to one or more devices of the smart device mesh via the non-local network; initiating a timer by the cloud-based automation system, responsive to the determining that the first automation routine is tagged as locally claimed; determining whether an execution success message is received by the cloud-based automation system from the local automation system prior to the timer reaching a predetermined failover time, the execution success message indicating successful execution of the first automation routine by the local automation system; and precluding execution of the first automation routine by the cloud-based automation system responsive to determining that the execution success message is received, or executing the first automation routine by the cloud-based automation system responsive to determining that the execution success message is not received.

According to another set of embodiments, a smart device mesh automation system is provided. The system includes a local automation system implemented by at least one hub device and comprising: a first network interface to communicatively couple with a cloud-based automation system via a non-local network; a second network interface to communicatively couple with a local area network (LAN) of a consumer premises, the smart device mesh having a plurality of devices disposed in the consumer premises, the plurality of devices communicatively coupled with the cloud-based automation system, and at least a portion of the plurality of devices being dual-connected devices that are further communicatively coupled with the local automation system via the LAN; one or more processors coupled with the first network interface and the second network interface; and a non-transitory processor-readable memory having instructions stored thereon which, when executed, cause the one or more processors to execute steps. The steps include: obtaining an automation routine that defines control of at least a second device of the plurality of devices automatically in response to detection of an associated trigger condition by at least a first device of the plurality of devices; determining whether the automation routine is locally claimable based at least one whether the first device and the second device are both dual-connected devices; and claiming the automation routine by the local automation system responsive to determining that the automation routine is locally claimable, the claiming comprising tagging the automation routine as locally claimed both at the local automation system and at the cloud-based automation system, such that detection of the associated trigger condition by at least the first device causes an automation request to be issued both to the local automation system and to the cloud-based automation system for default execution of the automation routine by the local automation system and for failover execution of the automation routine by the cloud-based automation system automatically in the event of failure of the default execution.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
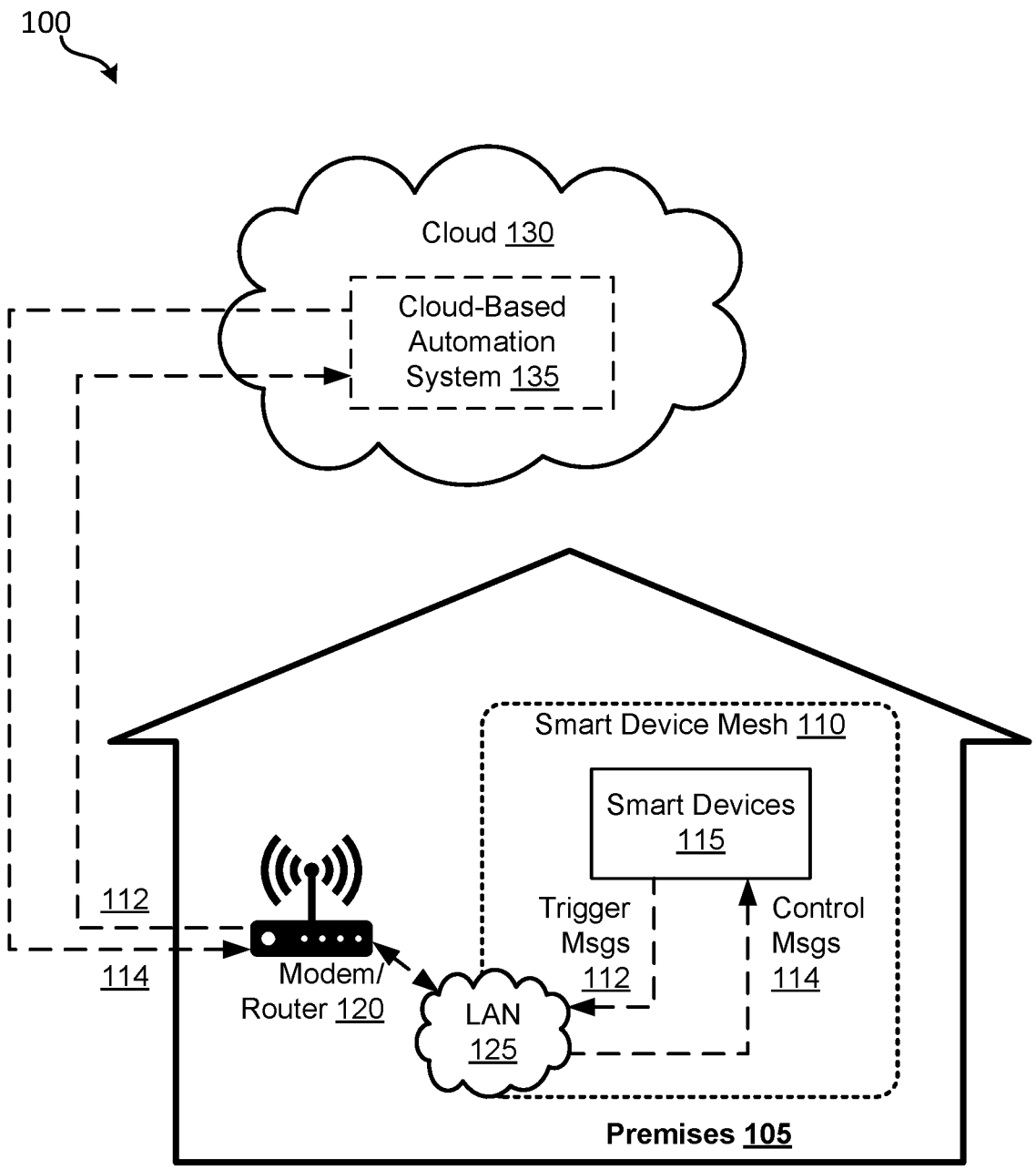
FIG. 1 shows a simplified example of a conventional smart premises environment.

Smart premises, such as smart homes, are becoming increasingly prevalent. For the sake of context, FIG. 1 shows a simplified example of a conventional smart premises environment 100. As illustrated, the environment 100 includes a consumer premises 105 (e.g., a home, office, etc.) in and/or around which there are multiple smart devices 115. The smart devices 115 are network-connected devices, such as smart sensors (e.g., smart audio input devices, light sensors, temperature sensors, presence sensors, etc.) that can be integrated with smart appliances (e.g., smart lighting, smart thermostats, and/or other smart environmental controls; smart televisions, smart speakers, smart displays, and/or other smart media devices; smart kitchen appliances; smart security systems; etc.). In some cases, the smart devices 115 also include one or more hub devices (not explicitly shown), which can be integrated into a dedicated device, or into a smart speaker, smart display, or other device.

The smart devices 115 are typically configured to communicate via a local area network (LAN) 125 in the premises 105 to form a smart device mesh 110 (e.g., a smart home mesh). Such connectivity can be used to allow the smart devices 115 to provide state information (e.g., whether a sensor has been triggered, whether lights are on or off, etc.) and/or to receive control information for remote control of the smart devices 115. Such remote control of the smart devices 115 can typically involve communications with the cloud 130 via the Internet, or any other suitable non-local network. As used herein, the term "cloud" refers generally to a network of remote servers hosted on the Internet that provides services to consumers using distributed storage, computation, application, and other computing resources. Similarly, the term "cloud-based" is used herein to mean hosted on and implemented by one or more servers in the cloud; i.e., remote from the premises 105. As illustrated, in a typical architecture, a network modem/router 120 in the premises 105 provides interconnectivity between the LAN 125 and the cloud 130.

The network connectivity and remote controllability of smart devices 115 in a smart device mesh 110 can facilitate automation of routines involving one or more of those smart devices 115. Conventionally, such automation tends to rely on all the smart devices in the smart device mesh 110 being in communication with a cloud-based automation system 135 (i.e., hosted by and implemented in the cloud 130). The cloud-based automation system 135 can store a representation of the consumer's premises 105, including all the smart devices 115, along with their respective locations and capabilities. For example, one or more smart lighting appliances or smart lighting controls can be located in the consumer's living room, and those can be represented in the cloud-based automation system 135 as "living room lights." Such representations can be configured in any suitable manner, such as via a portal application that allows a consumer to configure their smart devices 115 and their premises 105.

The stored representation in the cloud-based automation system 135 can be used to configure automation routines, and other smart device mesh 110 features. In general, each automation is triggered by at least one trigger condition detected by at least one of the smart devices 115 and results in a change to at least one controllable attribute of at least one of the smart devices 115. For example, a hub device (one of the smart devices 115) can detect the consumer saying "turn on the bedroom lights" (trigger condition). The hub device can send a corresponding trigger message 112 (labeled trigger msgs 112) to the cloud-based automation system 135. The cloud-based automation system 135 can find the appropriate network location and commands for one or more others of the smart devices 115 associated with the label "bedroom lights" in the stored representation. The cloud-based automation system 135 can then send a control message 114 (labeled control msgs 114) back to the "bedroom lights" to turn them on. In another example, an automation is configured to turn on the living room television whenever the consumer enters the room. An Internet of Things (IoT) presence sensor (one of the smart devices 115) can detect entry of the consumer into the living room (trigger condition). The hub device can send a corresponding trigger message 112 to the cloud-based automation system 135, which can find the appropriate network location and commands associated with the detected trigger condition, including the appropriate network location (e.g., network identifier, logical location, etc.) associated with the living room television (another of the smart devices 115). The cloud-based automation system 135 can then send a control message 114 back to premises 105 to turn on the living room television. Some examples of smart devices 115 arranged in similar types of smart device mesh configuration, including relevant context and conventional features and configurations, are described in PCT Patent Publication No. 2022/005965, titled "Distributed ambient computing within an environment," filed on Jun. 28, 2021, the disclosure of which is incorporated here in its entirety.

Such a cloud-based approach to smart device mesh 110 automation is highly effective, and provides robust scalability and other features. However, reliance on communications with a cloud-based automation system 135 can cause technical limitations on performance in some cases. One technical limitation is that responsiveness of cloud-based smart device mesh 110 automations are limited to the round-trip times of the communication links between the consumer premises 105 and the cloud 130 (e.g., availability of Internet infrastructure resources). Another technical limitation is that the automations may be unavailable, or the availability may be intermittent, in context of an unstable Internet connection, a network outage, etc.

One alternative to the conventional approach is to perform all smart device mesh 110 automations only via the LAN 125, thereby avoiding reliance on the Internet and on the cloud-based automation system 135. For example, one or more hub devices can be configured to control the other smart devices 115 in the smart device mesh 110, as well as any associated automations, directly via the LAN 125. However, such a local-only approach tends to have its own technical limitations. First, such a local-only approach relies on the availability of the controlling hub devices, and local automations cannot be carried out if the one or more hub devices are turned off or otherwise unavailable. Second, not all smart devices may be configured to communicate with and/or be controlled by particular brands or configurations of hub devices.

Figure 2:
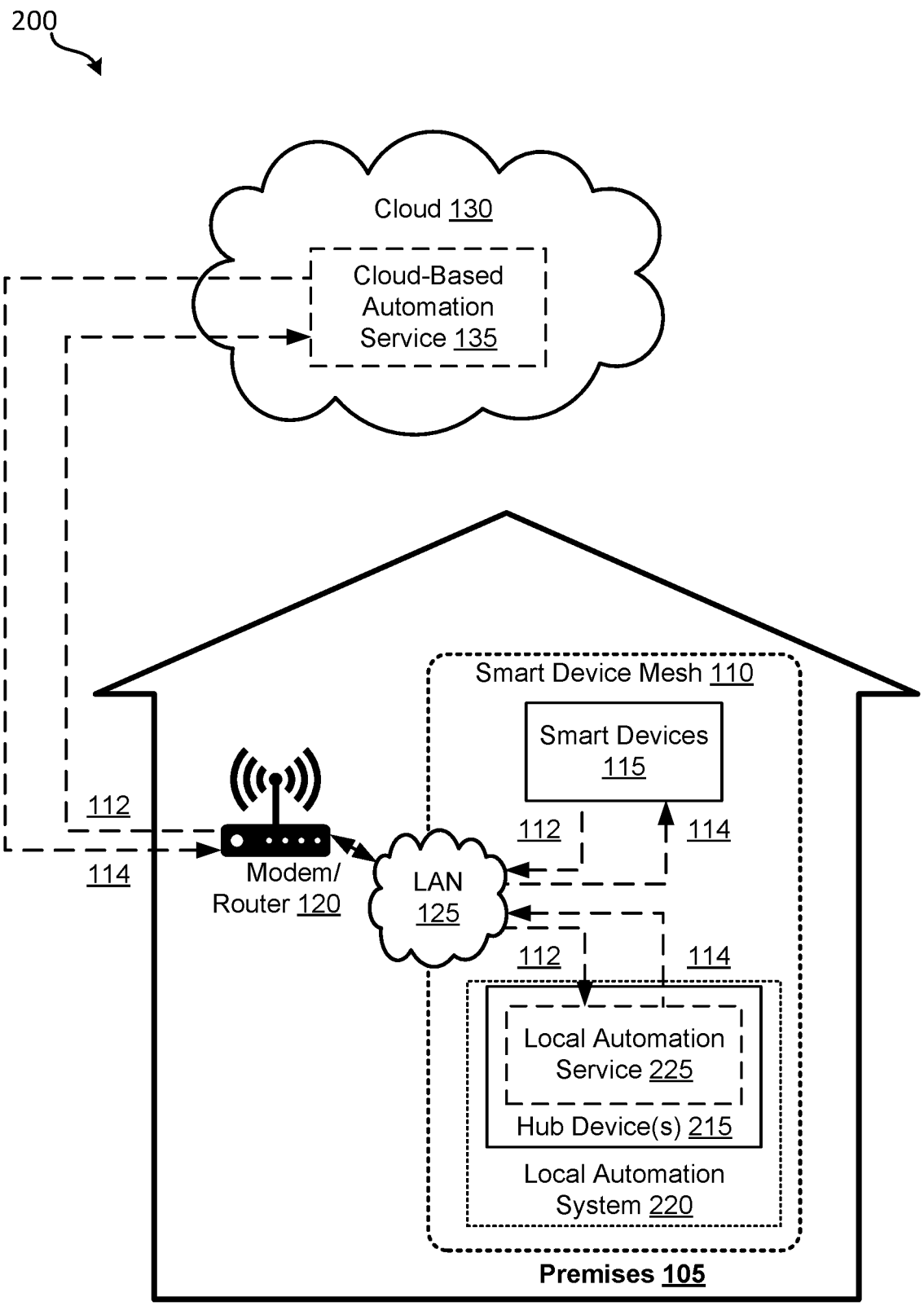
FIG. 2 shows a simplified illustration of a smart premises environment according to embodiments described herein.

Embodiments described herein facilitate selective local execution of smart device mesh 110 automation routines with cloud-based failover. FIG. 2 shows a simplified illustration of a smart premises environment 200 according to embodiments described herein. Similar to FIG. 1, a consumer premises 105 includes smart devices 115 in communication with a LAN 125 to form a smart device mesh 110. A modem/router 120 provides interconnectivity between the LAN 125 and the cloud 130. Unlike in FIG. 1, the environment 200 includes both a cloud-based automation system 135 and a local automation system 220. As described herein, the local automation system 220 can include one or more hub devices 215, each having an instance of a local automation service 225. In some cases, the local automation system 220 is implemented by the local automation service 225 of a single hub device 215. Although shown separately, the smart devices 115 can include the hub device(s) 215 (i.e., a hub device 215 can be one of the smart devices 115, be integrated with one of the smart devices 115, etc.).

In some embodiments, all of the smart devices 115 and the hub device 215 can be in communication with the LAN 125, which is in communication (e.g., via a router, modem, and/or any other suitable components) with the cloud 130 via one or more non-local networks (e.g., the Internet, not shown). Though shown as a single network, the LAN 125 can include multiple sub-LANs. As one example, a consumer may have multiple WiFi networks in a single physical premises, such as to provide more secure guess access, to provide better coverage throughout the premises, and/or for other reasons. As another example, some or all of the smart devices 115 and/or hub device(s) 215 can form IoT networks, short-range wireless networks (e.g., via Bluetooth, near-field communications, or the like), peer-to-peer networks, and/or other local networks. As such, reference to the LAN 125 herein generally refers to the overall local network or networks of the premises 105, including any one or more wired and/or wireless local networks involved in forming the smart device mesh 110. In some cases, one or more of the smart devices 115 and/or hub device 215 can be in communication with the cloud 130 via its own wired or wireless connection to the one or more non-local networks (i.e., without using the LAN 125). For example, a smart device 115 or hub device 215 may include components (e.g., antennas, ports, etc.) to establish cellular communications, a direct wired communications (e.g., Ethernet, fiberoptic, etc.), satellite communications, and/or other communications with the Internet.

A representation of the smart device mesh 110 in the consumer premises 105 and automation routines involving the devices of the smart device mesh 110 are stored both at the cloud-based automation system 135 and at the local automation system 220. For each automation routine, a determination is made whether to locally claim the automation routine by the local automation system 220. As used herein, "locally claiming" the automation routine means tagging the automation routine in any suitable way (both at the cloud-based automation system 135 and at the local automation system 220) to indicate that default execution of the automation routine is by the local automation system 220, and failover execution of the automation routine is by the cloud-based automation system 135 in the event of failed execution by the local automation system 220.

As described herein, embodiments of the local automation system 220 obtain a definition of an automation routine. For example, the automation routine can be set up by a consumer, such as via a portal application; received based on synchronization with the cloud-based automation system 135; etc. The local automation system 220 can determine whether to locally claim the automation routine based on determining which smart devices 115 and/or which capabilities are involved in executing the automation routine. As a threshold determination, embodiments can consider whether the involved smart devices 115 are in communication with the local automation system 220. For example, some smart devices 115 are communicatively coupled with the cloud-based automation system 135, but not with the local automation system 220; while others of the smart devices 115 are communicatively coupled with both. Those of the smart devices 115 that are communicatively coupled with both the cloud-based automation system 135 and the local automation system 220 are referred to herein as "dual-connected" devices. In some cases, even though involved smart devices 115 are communicatively coupled with the local automation system 220, further determinations are made prior to locally claiming an automation routine. For example, embodiments can further determine whether the hub device(s) 215 implementing the local automation system 220 are capable of communicating with the involved smart devices 115 in whatever manner is needed to successfully execute the automation routine; and/or embodiments can further determine whether one or more hub device(s) 215 that would be involved in executing the automation routine is available, turned on, etc.

Such a local claiming-based approach provides a number of technical features. One technical feature is that local claiming of automation routines can appreciably reduce response times and improve reliability for those automation routines by avoiding reliance on external networks, cloud-based resources, etc. Another technical feature is that, even for locally claimed automation routines, automatic cloud-based failover allows those automation routines to be executed even when hub devices 215 are unavailable, turned off, etc. Another technical feature is that, in smart device meshes 110 having multiple hub devices 215, some embodiments described herein provide for election of different executor hub devices to execute different ones of the locally claimed automation routines, such as to account for multiple sub-LANs of the LAN 125, different hub device 215 capabilities or configurations, etc. Another technical feature is that some embodiments provide automatic de-claiming of locally claimed automation routines based on monitoring of the local execution success rate of those automation routines. For example, a detected tendency to fail local execution of a particular, locally claimed automation routine can cause such embodiments to de-claim the automation routine so that subsequent execution is by the cloud-based automation system 135. These and other features will be apparent from descriptions of embodiments herein.

Figure 3:
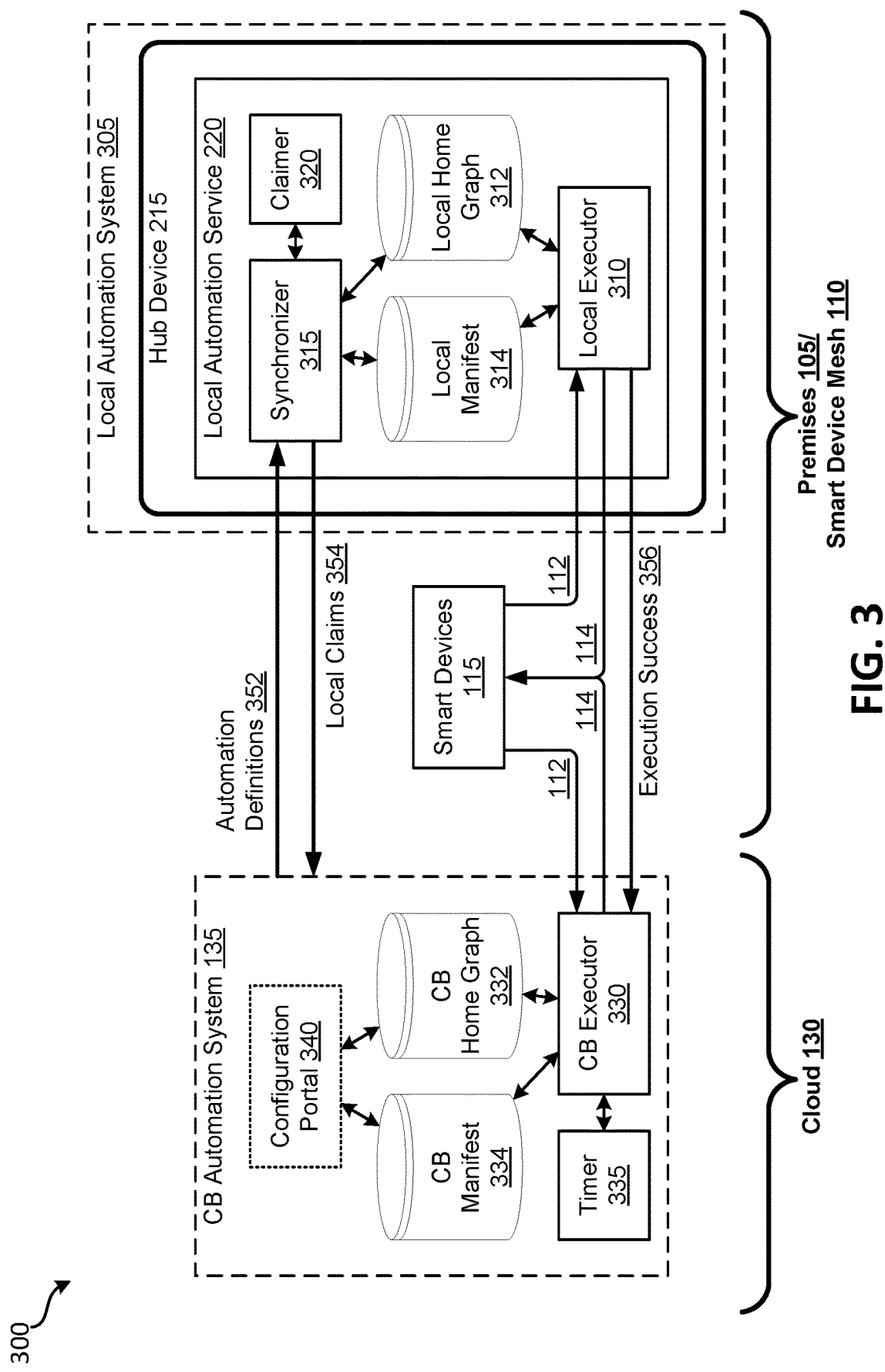
FIG. 3 shows a block diagram of an illustrative smart device mesh automation environment having both a local automation system and a cloud-based (CB) automation system, according to embodiments described herein.

FIG. 3 shows a block diagram of an illustrative smart device mesh 110 automation environment 300 having both a local automation system 220 and a cloud-based (CB) automation system 135, according to embodiments described herein. The illustrated environment can be an implementation of the environment 200 of FIG. 2. A smart device mesh 110 is disposed in a consumer premises 105. For purposes of FIG. 3, the premises 105 and the smart home mesh 110 are illustrated as coextensive; the cloud 130 is outside of, separate from, and remote from both. The smart device mesh 110 includes a number of smart devices 115 and a local automation system 220 implemented by a hub device 215 running a local automation service 225. The smart devices 115 and the hub device 215 are in communication with the cloud-based automation system 135 implemented in the cloud 130. At least some of the smart devices 115 are assumed to be dual-connected devices, such that those devices are also in communication locally with the hub device 215. For example, the dual connected devices are communicatively coupled with the hub device 215 via a wireless (e.g., WiFi) link to the hub device 215 or to a LAN router, a wired (e.g., Ethernet) link to the hub device 215 or to a LAN router, a local mesh network, a peer-to-peer network an IoT network, etc.

The hub device 215 is a computing device having one or more processors. For example, the one or more processors can include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. The hub device 215 can also include non-transitory processor-readable memory that stores instructions, which, when executed, cause the one or more processors to implement the local automation service 225.

Embodiments of the local automation service 225 include a local executor 310, a synchronizer 315, and a claimer 320. Local storage of the hub device 215 can be used to store a local home graph 312 and a local manifest 314. The local storage can be the same non-transitory processor-readable memory that stores the instructions for implementing the local automation service 225, or the local storage can be separate storage. The local storage can include any suitable types of data storage for storing the various types of data, such as one or more solid-state drives, hard disk drives, registers, databases, etc. In some implementations, the local storage is integrated in the hub device 215. In other implementations, the local storage is in a separate storage device (e.g., an external drive) in communication with the hub device 215. Embodiments of the cloud-based automation system 135 can include a cloud-based executor 330 and a timer 335. Cloud-based storage resources can be used to store a cloud-based home graph 332 and a cloud-based manifest 334.

As described with reference to FIG. 2, an automation routine can be generated in any suitable manner. In some implementations, the cloud-based automation system 135 is configured to communicate with consumer devices (e.g., smartphones, laptop computers, tablet computers, smart displays, etc.) via a configuration portal application 340, and the configuration portal application 340 can be used to set up the cloud-based home graph 332. For example, a consumer can use the configuration portal application 340 to set up a user account, and to register their smart devices 115 with the user account as associated with a smart device mesh 110. A representation of the smart device mesh 110 can be stored as the cloud-based home graph 332. Some implementations allow the consumer to use the configuration portal application 340 to configure the cloud-based home graph 332 to include logical definitions of physical spaces of the premises 105 with which to associate the locations of smart devices 115, such as "master bedroom," "living room," "rear deck," "upstairs," "swimming pool," etc.; and/or to include functional groupings to which smart devices 115 can be assigned, such as "lighting system," "cooling system," "security system," "entertainment," etc. For example, the cloud-based home graph 332 can be used to map network identifiers for a set of smart lighting appliances to the logical identifier "living room lights," to map network identifiers for a smart speaker to the logical identifier "master bedroom speaker," etc. The definitions in the cloud-based home graph 332 can be hierarchical. For example, a same lighting fixture can be part of "main floor lights," "kitchen lights," "lights over the kitchen sink," etc. Additionally or alternatively, the cloud-based home graph 332 can be populated, configured, and/or the like in other ways. In some implementations, some smart devices 115 can register themselves with the cloud-based home graph 332, including determining an appropriate name, location, etc.

Embodiments of the synchronizer 315 can interact with the cloud-based automation system 135 to synchronize the local home graph 312 with the cloud-based home graph 332. In some embodiments, a consumer can have multiple defined premises 105, each with its own local automation system 220, and a single cloud-based home graph 332 may be used to store representations of all the premises 105 in association with the same consumer account. Implementations of the cloud-based home graph 332 can permit hierarchical definitions to include a premises level, such as to distinguish "home main floor lighting," "office main floor lighting," "rental apartment main floor lighting," etc. In some such embodiments, the synchronizer 315 fully synchronizes the local home graph 312 and the cloud-based home graph 332 in all local automation systems 220 at all premises 105 of the consumer, even though some of the information is not locally relevant. In other such embodiments, the synchronizer 315 determines which portions of the cloud-based home graph 332 are locally relevant to the local automation system 220 of each particular premises 105, and the synchronizer 315 only synchronizes each local home graph 312 with those portions deemed to be locally relevant.

Additionally or alternatively, some embodiments facilitate configuration and/or reconfiguration of the local home graph 312 directly via the local automation system 220. For example, though not explicitly shown, the same or a different configuration portal application can be used to provide the consumer with direct access to configuration features of the local automation service 225. In such embodiments, the synchronizer 315 can synchronize any configurations and/or reconfigurations of the local home graph 312 with the cloud-based home graph 332 at the cloud-based automation system 135.

Similar techniques as those used to set up the local home graph 312 and the cloud-based home graph 332 can also be used to set up automation routines for the smart devices 115 of the smart device mesh 110 and to store those automation routines in the local manifest 314 and in the cloud-based manifest 334. In some embodiments, registration and/or configuration of a smart device 115 causes automatic configuration of automation routines. For example, when a smart lighting appliance is placed in a room, it may automatically register itself with a previously configured smart lighting controller in the same room, and one or the other smart device 115 can automatically establish automation routines that allow the smart lighting controller to control the smart lighting appliance in various ways. In some embodiments, during registration and/or configuration of a smart device 115, a consumer may be provided with a list of predefined automation routines that can be selected for automatic configuration. Such a list can be provided on the device itself (e.g., in the case of a smart display, or any device with a suitable user interface), on another connected device (e.g., on the user's smartphone as part of a setup routine for the smart device 115), on another device via the configuration portal application 340, etc. In some embodiments, the configuration portal application 340 provides consumers with an interface by which to manually setup and/or modify automation routines. For example, implementations of the configuration portal application 340 permit consumers and/or others to program automation routines using one or more coding languages, using natural language, using graphical representations, using verbal commands, and/or using other techniques.

Regardless of the manner of setting up the automation routines, the automation routines can ultimately be defined (e.g., directly, or by be translated or compiled) in any suitable manner that is interpretable, and thereby executable, by the local executor 310 and/or by the cloud-based executor 330. For example, each automation routine is a set of processor-readable instructions which, when executed, cause one or more processors of the cloud-based automation system 135 and/or one or more processors of the local automation system 220 to execute the automation routine. In some embodiments, as illustrated in FIG. 3, automation routines can be generated first at the cloud-based automation system 135 for storage in the cloud-based manifest 334, and the synchronizer 315 can maintain a synchronized copy of the definitions of the automation routines at the local manifest 314 of the local automation system 220. The transfer of automation routine definitions from the cloud-based automation system 135 to the local automation system 220 via the synchronizer 315 is labeled as arrow 352 in FIG. 3. Although not illustrated as such, other embodiments can be configured so that some or all automation routines are generated first at the local automation system 220 for storage in the local manifest 314, and the synchronizer 315 can send information to maintain a synchronized copy of the definitions of the automation routines at the cloud-based manifest 334 of the cloud-based automation system 135.

For each of the automation routines in the manifests (i.e., synchronized in both the local manifest 314 and the cloud-based manifest 334), embodiments of the claimer 320 determine whether to locally claim the automation routine. As described with reference to FIG. 2, such a determination can involve determining which smart devices 115 are involved in carrying out the automation routine and whether those smart devices 115 are all dual-connected devices. Each automation routine necessarily involves at least a first smart device 115 that detects a trigger event defined for execution of the automation routine, and at least a second smart device 115 that is controlled in a manner defined by the automation routine in response to the trigger event. In some cases, a single automation routine can be triggered by multiple alternative trigger conditions. In some cases, a single automation routine is only triggered by detection of multiple trigger conditions. In some cases, triggering of an automation routine causes remote control of a single controllable attribute of a single smart device 115. In some cases, triggering of an automation routine causes remote control of multiple controllable attributes of a single smart device 115, a single controllable attribute of multiple smart devices 115, or multiple controllable attributes of multiple smart devices 115. In some cases, one or more smart devices 115 that triggers execution of the automation routine (the at least a first smart device 115) can also be one or more of the smart devices 115 that is remotely controlled by the automation routine (the at least a second smart device 115). For example, one smart speaker on the second floor of a house may detect a voice command to trigger playback of music on all second-floor speakers of the house.

As described above, the involved smart devices 115 are considered dual-connected devices when they are in remote communication with the cloud-based automation system 135 and also in local communication with the local automation system 220. If the claimer 320 determines that one or more of the involved smart devices 115 is not a dual-connected device, there is no way for the automation routine to be fully executed locally by the local automation system 220, and the claimer 320 will not locally claim the automation routine. In some embodiments, if the claimer 320 determines that all of the involved smart devices 115 are dual-connected devices, the claimer 320 will locally claim the automation routine. In other embodiments, one or more further determinations are made by the claimer 320 prior to locally claiming the automation routine.

In some embodiments, the claimer 320 only locally claims an automation routine upon further determining that the local automation system 220 is capable of performing all steps of the automation routine. For example, any particular step of the automation routine can involve remotely controlling one or more particular controllable attributes of one or more particular smart devices 115 in one or more particular ways; and embodiments of the controller 320 can determine whether a known set of capabilities of the local automation system 220 (e.g., of the hub device 215) are compatible with executing that particular step. One implementation permits a consumer to test local execution of a particular automation routine prior to the automation routine being locally claimed by the claimer 320. Either the local automation system 220 can automatically detect whether the test local execution was successful, or a consumer can manually indicate whether the test local execution was successful; and the claimer 320 can locally claim the automation routine only after receiving an indication that the test local execution was successful.

Local claiming of an automation routine by the claimer 320 is indicated as an attribute in the definition of the automation routine in the local manifest 314. For example, the definition of each automation routine includes a tag (e.g., a field, a flag, a bit, a trait, etc.) indicating whether the automation routine is locally claimed. As indicated by arrow 354, the local claiming can be synchronized by the synchronizer 315 to update the definition of the automation routine in the cloud-based manifest 334. Both the local automation system 220 and the cloud-based automation system 135 have a synchronized record of whether each automation definition is locally claimed.

During operation of the smart device mesh 110, a trigger event can be detected by one of the smart devices 115. For example, the trigger event can be based on detecting a change in state of a sensor or other analog or digital component, detecting crossing of a threshold illumination or temperature level, reaching of a particular clock time, elapsing of an amount of time after another occurrence, presence detection, facial recognition, gesture recognition, etc.), detecting audio commands, and/or any other suitable trigger condition. Detection of the trigger condition can correspond to one or more trigger messages 112 being communicated from the detecting smart device(s) 115 to both the cloud-based automation system 135 and the local automation system 220. Both systems identify which automation routine or routines stored in their respective manifest (i.e., in the cloud-based manifest 334 and the local manifest 314) is associated with the trigger condition indicated by the trigger message(s) 112. Each of the cloud-based automation system 135 and the local automation system 220 can determine whether the automation routine is locally claimed based whether the stored definition of the automation routine is tagged as such.

If the automation routine is not locally claimed, the triggered automation routine is automatically executed by the cloud-based executor 330 of the cloud-based automation system 135 (e.g., and ignored by the local automation system 220). As part of executing the automation routine, the cloud-based executor 330 sends any relevant command messages 114 back to the smart device mesh 110 at the premises 105 to remotely control one or more smart devices 115 in accordance with the automation routine definition. If the automation routine is locally claimed, the cloud-based automation system 135 does not immediately execute the automation routine. Rather, the local executor 310 at the local automation system 220 attempts execution of the triggered automation routine, and the cloud-based automation system 135 concurrently initiates a timer 335. The timer 335 is associated with a predetermined failover time. In some implementations, the timer 335 is a countdown timer that begins counting down from the predetermined failover time when initiated. In other implementations, the timer 335 is a count-up timer. The predetermined failover time can be the same for all automation routines, or different predetermined failover times can be configured for different automation routines.

Assuming the local executor 310 is able to execute the triggered automation routine (e.g., the that the hub device 215 is available, operational, etc.), local execution involves the local executor 310 sending any relevant command messages 114 to control one or more smart devices 115 in accordance with the automation routine definition. Upon successful completion of the execution of the automation routine, the local automation system 220 (the local executor 310) sends an execution success message 356 to the cloud-based automation 135. When the cloud-based executor 330 receives the execution success message 356, the cloud-based executor 330 stops the timer 335 and precludes execution of the automation routine. If execution by the local automation system 220 is unsuccessful, the local executor 310 will not send the execution success message 356. If the timer 335 reaches the predetermined failover time and the local executor 310 has not yet received the execution success message 356, the cloud-based automation system 135 (i.e., the cloud-based executor 330) will take over execution of the automation routine. Thus, for locally claimed automation routines, default execution is by the local executor 310; but the cloud-based executor 330 will automatically take over execution if the default local execution is unsuccessful.

Figure 4:
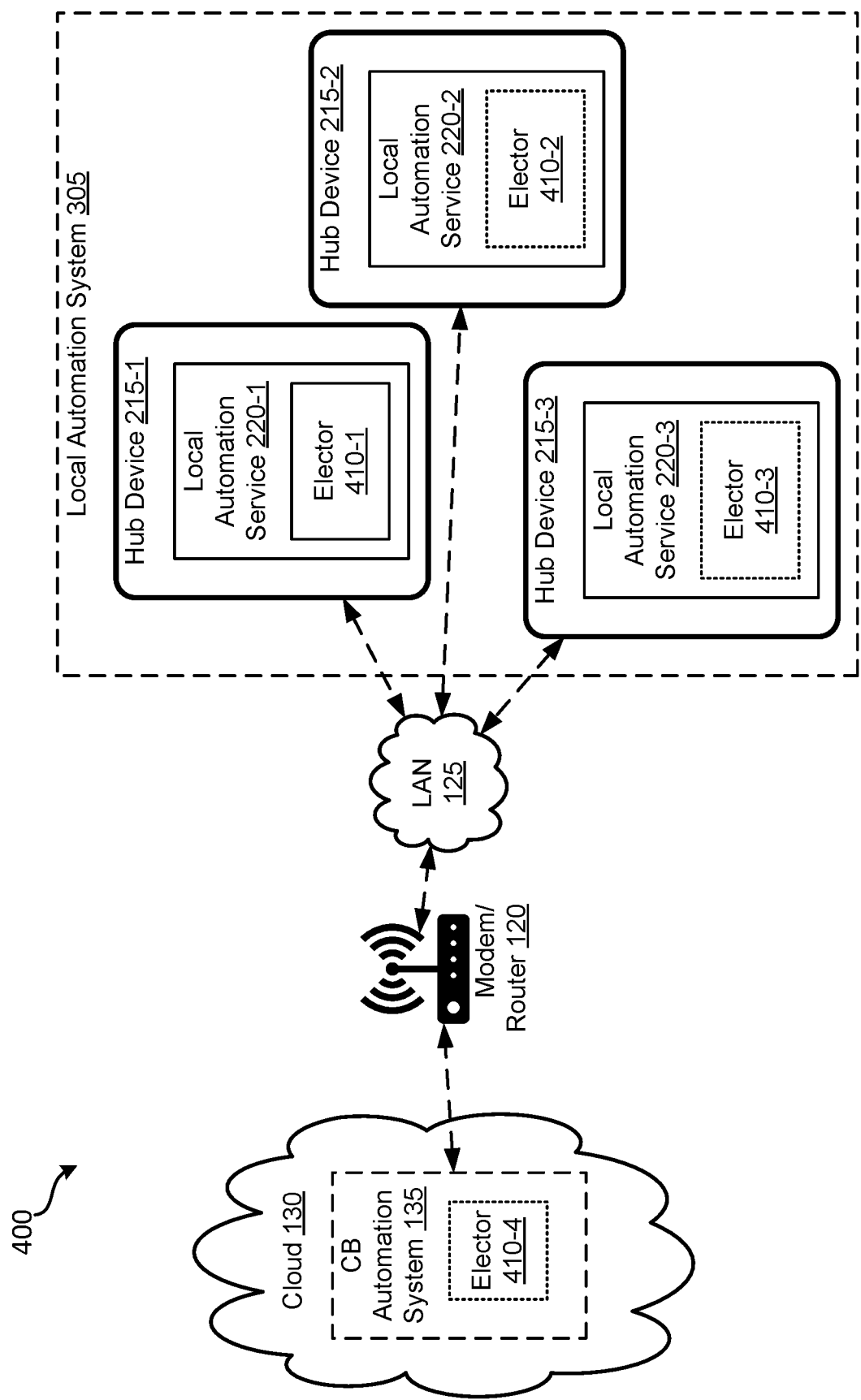
FIG. 4 shows a simplified block diagram of a smart device mesh automation environment with a local automation system that includes multiple hub devices, according to some embodiments described herein.

FIG. 4 shows a simplified block diagram of a smart device mesh 110 automation environment 400 with a local automation system 220 that includes multiple hub devices 215, according to some embodiments described herein. Similar to FIGS. 2 and 3, the environment 400 includes a local automation system 220 (in a consumer premises) and a cloud-based automation system 135 in the cloud 130. For context the local automation system 220 is shown in communication with the cloud-based automation system 135 via a LAN 125 and a modem/router 120. In contrast to embodiments of FIG. 3 that show only a single hub device 215 implementing the local automation system 220, the embodiments of FIG. 4 show the local automation system 220 implemented by multiple hub devices 215, each with an instance of the local automation service 225. Although FIG. 4 shows three hub devices 215, the local automation system 220 can be implemented by any suitable number of hub devices 215. In some implementations, each instance of the local automation service 225 is synchronized to be substantially identical. In some implementations, each hub device 215 has a local copy of the local manifest 314 (e.g., and the local home graph 312), and the synchronizers 315 of the local automation service 225 instances are configured to ensure that all copies are kept up to date.

In embodiments with multiple hub devices 215, different ones of the hub devices 215 may be more or less suited to executing particular ones of the automation routines. In association with locally claiming automation routines, embodiments of the local automation system 220 can elect an executor hub device of the hub devices 215 to be responsible for local execution of each locally claimed automation routine. In some embodiments, not all of the hub devices 215 is in communication with all of the smart devices 115 in the smart device mesh 110, and the election for any particular automation routine is based on which of the hub devices 215 is determined to be in communication with those of the smart devices 115 involved in executing the automation routine. For example, the LAN 125 can include multiple sub-LANs, and different ones of the smart devices 115 and different ones of the hub devices 215 may be in communication with different ones of the sub-LANs. In such a case, the electing for an automation routine can involve determining which of the smart devices 115 is involved in executing the automation routine, determining with which sub-LAN or sub-LANs those smart devices 115 are in communication, and electing the executor hub device as the hub device 215 (or one of the hub devices 215) that is also in communication with the same sub-LAN or sub-LANs.

In other embodiments, different ones of the hub devices 215 have different feature configurations, and the election can be based on which feature configuration is most compatible with execution of the automation routine. In one such embodiment, the electing includes determining one or more control features involved with executing a particular automation routine, and determining the executor hub device as one of the hub devices 215 for which the respective feature configuration is compatible with the one or more control features. For example, such a determination can include evaluating whether a particular one or more of the hub devices 215 is capable of controlling all of the involved smart devices 115 (e.g., whether the hub device 215 includes required application programming interfaces, function libraries, etc.), and/or whether the particular one or more of the hub devices 215 is capable of controlling the involved smart devices 115 in all of the ways needed to carry out steps of the automation routine. In other embodiments, the different feature conditions may be evaluated more globally (i.e., not with respect to particular automation routines). For example, a particular hub device 215 may be elected as the executor hub device for some or all automation routines based on which device is most updated (e.g., which has the latest firmware updates, patches, etc.), which is the most secure, which has the most control capability in general, etc.

The electing can be performed by an elector 410. In some embodiments, the elector 410 is implemented in one instance of the local automation service 225. For example, there may be a master local automation service 225 that maintains the local home graph 312 and determines elections on behalf of the entire smart device mesh 110. In other embodiments, each instance of the local automation service 225 includes a respective instance of the elector 410 (shown as 410-1, 410-2, and 410-3 for the three instances). For example, the hub devices 215 via hub-to-hub communications. In other embodiments, the cloud-based automation system 135 can implement the elector 410 (shown as 410-4). Techniques related to claiming of automations in a distributed computing environment are also described in PCT Patent Publication No. 2022/005965, referenced above.

One feature of local claiming is the reduction of response times due to local execution (i.e., avoiding round-trip times and/or other processing times associated with cloud-based execution). However, in a case where local execution fails, the failover cloud-based execution of the approach described herein includes the same conventional cloud-based execution delays plus the additional purposeful delay introduced by the timer 335. Thus, if a locally claimed automation routine consistently fails to be executed locally, the result can be worse than if there were no local execution at all. As such, some embodiments monitor execution of locally claimed automation routines to determine whether the automation routines are being successfully executed by the local executor 310. If not, such embodiments can automatically determine whether to de-claim the automation routine. As used herein, "de-claiming" an automation routine means removing local claiming from the automation routine by handing default execution of the automation routine back to the cloud-based executor 330. For example, such de-claiming can involve updating a trait (e.g., flag, bit, etc.) stored in association with the automation routine to indicate that the automation routine is not locally claimed.

Figure 5A:
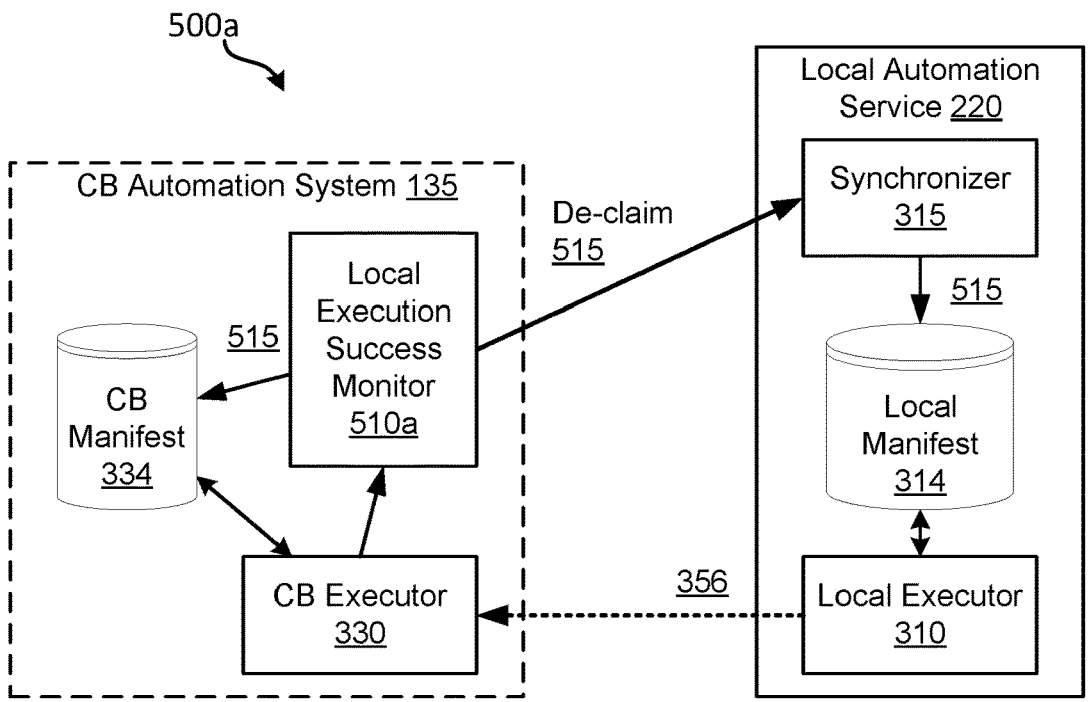
FIGS. 5A and 5B show simplified block diagrams of two examples of partial smart device mesh automation environments to support automatic de-claiming of automation routines, according to some embodiments described herein.
Figure 5B:
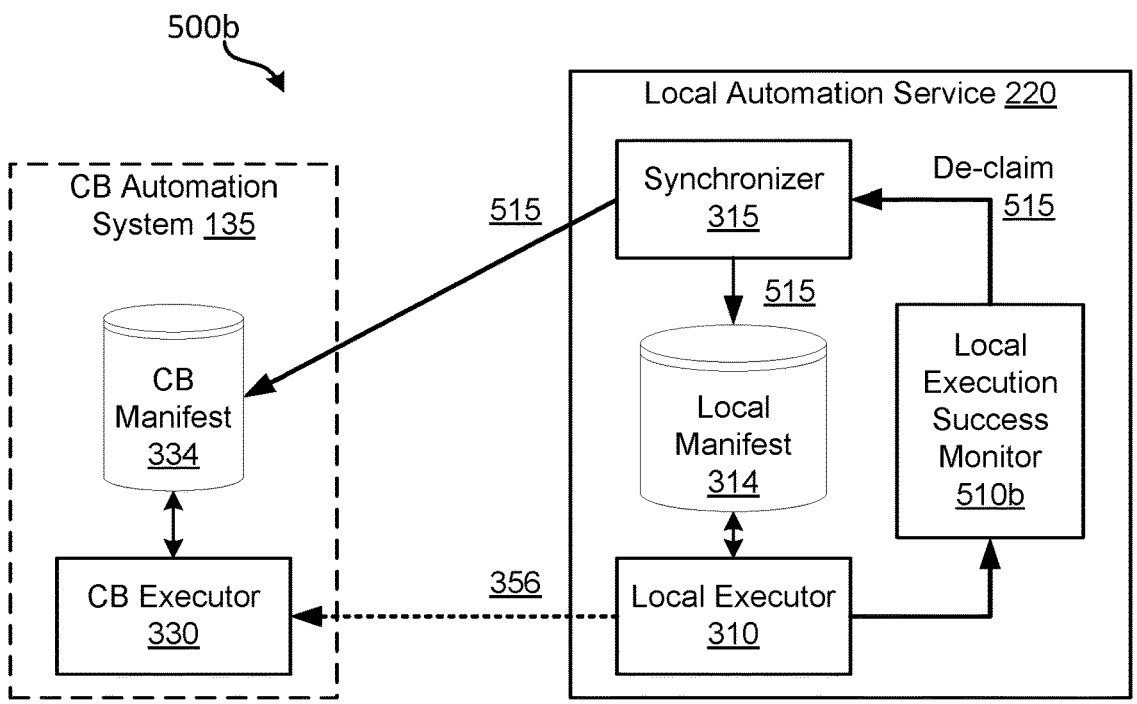

FIGS. 5A and 5B show simplified block diagrams of two examples of partial smart device mesh 110 automation environments 500 to support automatic de-claiming of automation routines, according to some embodiments described herein. The illustrated environments 500 can represent relevant portions of any of the environments described with reference to FIGS. 2-4. In both FIGS. 5A and 5B, the illustrated environment 500 includes a local automation service 225 (implemented in a local automation system at a consumer premises) in communication with a cloud-based automation system 135 (implemented in the cloud). The local automation service 225 includes a local executor 310 and a local manifest 314, and the cloud-based automation system 135 includes a cloud-based executor 330 and a cloud-based manifest 334. A synchronizer 315 in the local automation service 225 ensures that the local manifest 314 is synchronized with at least the relevant portions of the cloud-based manifest 334.

It is assumed in the context of FIGS. 5A and 5B that a number of automation routines have been set up, and at least some of the automation routines have previously been claimed by the local automation service 225. Each time a locally claimed automation routine is executed, a local execution success monitor 510 can monitor the execution of the automation routine to automatically log whether the automation routine was successfully located by the local executor 310 (i.e., the default local execution was successful), or whether the automation routine was executed by the cloud-based executor 330 (i.e., failover execution occurred). Based on the automated monitoring and logging, the local execution success monitor 510 can automatically determine whether to de-claim the automation routine, and the local execution success monitor 510 can generate a de-claim message 515, accordingly. In one embodiment, the local execution success monitor 510 automatically de-claims the automation routine after logging a predetermined number of failed local execution attempts. In another embodiment, the local execution success monitor 510 automatically de-claims the automation routine after logging a predetermined number of failed local execution attempts in a row, or within a predetermined time window. In another embodiment, the local execution success monitor 510 computes a statistical likelihood of successful local execution based on the logging and automatically de-claims the automation routine responsive to the statistical likelihood falling below a predetermined threshold.

In some embodiments, prior to automatically de-claiming an automation routine, the local execution success monitor 510 can direct determination of whether there is another instance of the local automation service 225 that may be able to locally execute the automation routine with more success. As described with reference to FIG. 4, the local execution success monitor 510 can direct an elector 410 to re-execute an election routine to determine one of multiple hub devices 215 to elect as an executor hub device. Such a re-election attempt can be performed with or without excluding the presently failing instance of the local automation service 225. For example, the re-election can be performed only among hub devices 215 not previously elected to execute the automation routine.

Turning to FIG. 5A, the environment 500a includes the local execution success monitor 510 disposed in the cloud-based automation system 135 (labeled local execution success monitor 510a). In such implementations, the local execution success monitor 510a performs automated monitoring and logging based on an indication from the cloud-based executor 330 of whether local execution was successful. The cloud-based executor 330 can generate a message based on whether it performed failover execution of the automation routine. For example, the message is generated responsive to whether the execution success message 356 is received, whether the predetermined failover time elapses on the timer 335, etc. In another implementation, the local execution success monitor 510a determines whether the automation routine was successfully locally performed based on directly receiving the execution success message 356 and/or another message from the local automation service 225.

Upon determining to de-claim a particular automation routine, the local execution success monitor 510a generates a de-claim message 515. In some embodiments, the de-claim message 515 is used to update the cloud-based manifest 334 so that the stored representation of the automation routine is no longer indicated as local claimed; at a next synchronization time, the synchronizer 315 will cause the local manifest 314 to be updated, accordingly. Additionally or alternatively, embodiments can send the de-claim message 515 directly to the local automation service 225. For example, the de-claim message 515 is sent to the synchronizer 315 (or the claimer, or any other suitable component) to update the local manifest 314 so that the stored representation of the automation routine is no longer indicated as local claimed; at a next synchronization time, the synchronizer 315 will cause the cloud-based manifest 334 to be updated, accordingly.

Turning to FIG. 5B, the environment 500b includes the local execution success monitor 510 disposed in the local automation service 225 (labeled local execution success monitor 510b). In such implementations, the local execution success monitor 510b performs automated monitoring and logging based on an indication from the local executor 310 of whether local execution was successful. For example, when local execution is successful, the local executor 310 sends the execution success message 356 both to the cloud-based executor 330 and to the local execution success monitor 510b. In another implementation, the local execution success monitor 510b determines where the automation routine was executed based on messaging from the cloud-based automation system 135. Upon determining to de-claim a particular automation routine, the local execution success monitor 510b generates a de-claim message 515. In some embodiments, the de-claim message 515 is used to update the local manifest 314 so that the stored representation of the automation routine is no longer indicated as local claimed; at a next synchronization time, the synchronizer 315 will cause the cloud-based manifest 334 to be updated, accordingly. Additionally or alternatively, embodiments can send the de-claim message 515 directly to the cloud-based automation system 135 for use in updating the cloud-based manifest 334.

Embodiments described above assume that when the local execution success monitor 510 (in either of FIG. 5A or 5B) determines to de-claim an automation routine, it will automatically send any de-claim messages to cause the de-claiming. Alternatively, some embodiments do not automatically de-claim the automation routine; rather, such embodiments can send a message to a consumer (e.g., via the configuration portal application 340, via email, via text messaging, via a smart display or smart speaker of the smart device mesh 110, or in any other suitable manner) to recommend to the consumer to de-claim the automation routine. The consumer may subsequently respond to the message by directing de-claiming of the automation routine. For example, the consumer may use the configuration portal application 340 to communicate with a local execution success monitor 510a in the cloud-based automation system 135 (e.g., as in FIG. 5A); or the consumer may directly interact with a hub device 215 or other component to communicate with a local execution success monitor 510b in the local automation system 220 (e.g., as in FIG. 5B).

Additionally, the monitoring can be used to trigger certain diagnostic features. For example, detecting by the local execution success monitor 510 that a particular hub device 215 is failing all its local execution attempts, or determining that local execution is failing for all automation routines involving a particular set of the smart devices 115 (e.g., a type of device, a logical grouping of devices, devices on a particular sub-LAN, devices in a particular geographic location, etc.) may indicate a problem with one the particular hub 215, with the set of smart devices 215, with a particular sub-LAN, with localized power (e.g., a particular breaker or outlet), etc. Such information can be used automatically to trigger health checks and/or other diagnostics, or to send indications to consumers (e.g., via the configuration portal application 340) of potential concerns with devices and/or configurations.

Figure 6:
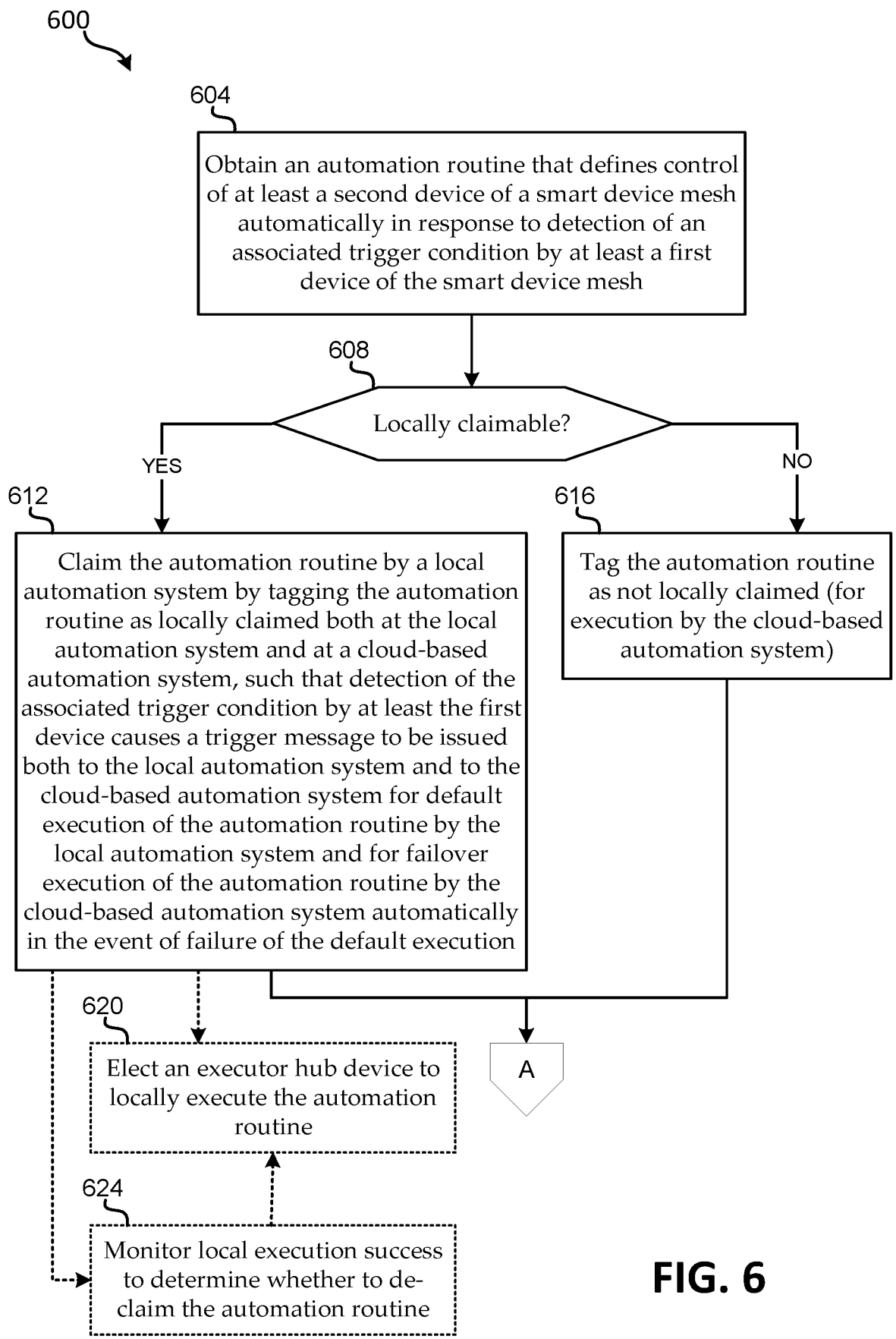
FIG. 6 shows a flow diagram of an illustrative method for selective local execution of automation routines in a smart device mesh, according to embodiments described herein.

FIG. 6 shows a flow diagram of an illustrative method 600 for selective local execution of automation routines in a smart device mesh, according to embodiments described herein. Embodiments of the method 600 can be implemented using any suitable systems, including those described with reference to FIGS. 2-5B above. As described herein, such systems have multiple devices (i.e., smart devices 115 configured as a smart device mesh 110) disposed in a consumer premises (i.e., premises 105) and communicatively coupled with a cloud-based automation system (i.e., cloud-based automation system 135). At least some of the devices are dual-connected devices that are further communicatively coupled with a local automation system (i.e., local automation system 220) of the consumer premises.

Embodiments begin at stage 604 by obtaining (e.g., by the local automation system 220) an automation routine that defines control of at least a second device of the smart device mesh 110 automatically in response to detection of an associated trigger condition by at least a first device of the smart device mesh 110. The obtaining can be part of configuring the smart device mesh 110, part of configuring one or more of the smart devices 115 associated with the automation routine, as part of a synchronization with the cloud-based automation system 135, etc.

At stage 608, embodiments can determine (e.g., by the local automation system 220) whether the automation routine appears to be locally claimable. In some embodiments, this determination involves determining whether the first device and the second device (e.g., and any others of the devices of the smart device mesh 110 involved in the automation routine) are ones of the dual-connected devices. For example, the local automation system 220 can attempt to communicate with each device, the connectivity can be stored in a lookup table or database (e.g., in the local home graph 312 and/or the cloud-based home graph 332), etc. In other embodiments, the determination at stage 608 further involves determining (e.g., by the local automation system 220) whether the local automation system 220 is capable of controlling at least the second device as defined by the automation routine. For example, the local automation system 220 can determine whether it has the appropriate libraries, APIs, ports, and/or other features needed to control all devices involved in the automation routine in the manner defined by the automation routine.

If the determination at stage 608 is that the automation routine is locally claimable, embodiments can proceed, at stage 612, by claiming the automation routine by the local automation system 220. The claiming can include tagging the automation routine (e.g., setting a flag or bit, changing a trait or attribute, etc.) as locally claimed both at the local automation system 220 and at the cloud-based automation system 135. As described herein, the result of such local claiming is that detection of the associated trigger condition by at least the first device causes a trigger message 112 to be issued both to the local automation system 220 and to the cloud-based automation system 135 for default execution of the automation routine by the local automation system 220 and for failover execution of the automation routine by the cloud-based automation system 135 automatically in the event of failure of the default execution.

Figure 7:
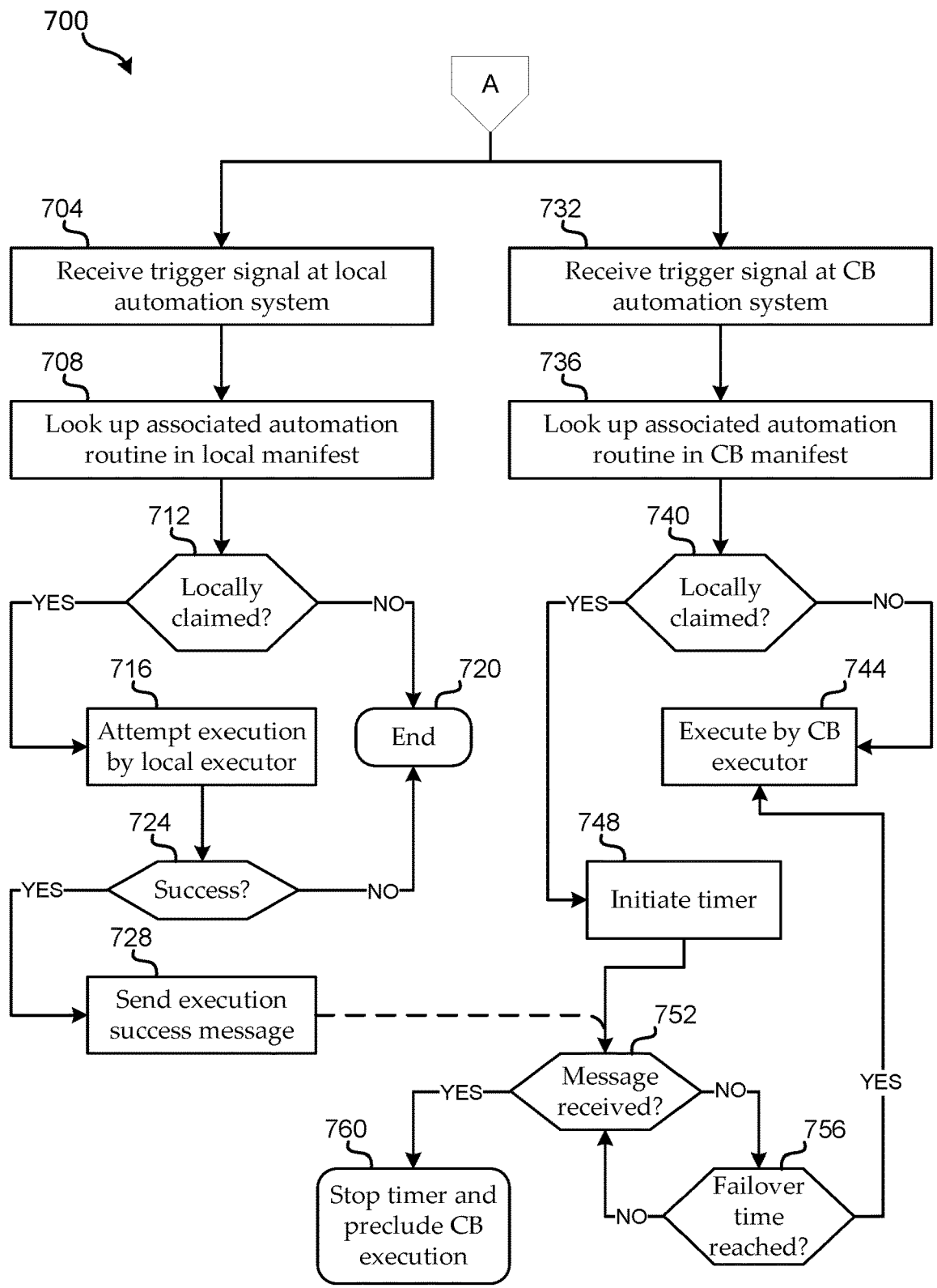
FIG. 7 shows a flow diagram of another method for selective local execution of automation routines in a smart device mesh, such as continuing subsequent to the method of FIG. 6, according to embodiments described herein.

As indicated by off-page reference "A", some embodiments can continue with the method 700 of FIG. 7. FIG. 7 shows a flow diagram of another method 700 for selective local execution of automation routines in a smart device mesh, such as continuing subsequent to the method 600 of FIG. 6, according to embodiments described herein. For example, the method 700 assumes that automation routines have already been set up, and at least one of those routines was locally claimed in accordance with the method 600 of FIG. 6. The method 700 begins at stage 704 by receiving an indication at the local automation system 220 of detection of an associated trigger condition of one of the previously configured automation routines. At stage 708, embodiments of the local automation system 220 can search for and identify an automation routine in its local manifest 314 that is associated with (i.e., triggered by) the indicated trigger condition. At stage 712, embodiments of the local automation system 220 can determine whether the identified automation routine is a locally claimed automation routine. Concurrently with (in parallel with) these stages performed by the local automation system 220, the cloud-based automation system 135 can perform similar stages. As illustrated, the cloud-based automation system 135 can also receive the indication of detection of the associated trigger condition at stage 732, the cloud-based automation system 135 can also search for and identify an associated automation routine in its cloud-based manifest 334 at stage 736, and the cloud-based automation system 135 can also determine whether the identified automation routine is a locally claimed automation routine at stage 740.

In the event that stages 712 and 740 determine that the automation routine is not a locally claimed automation routine, the local automation system 220 can ignore the automation routine and end at stage 720, and the cloud-based automation system 135 can execute the automation routine at stage 744 (by the cloud-based executor 330). In the event that stages 712 and 740 determine that the automation routine is a locally claimed automation routine, the local automation system 220 can initiate execution at stage 716 (by the local executor 310) of the automation routine by attempting control of one or more devices of the smart device mesh 110 in accordance with the automation routine. Concurrently, at stage 748, the cloud-based automation system 135 can initiate a timer (i.e., timer 335).

At stage 724, a determination can be made as to whether local execution of the automation routine was successful. When local execution is unsuccessful, the local automation system 220 may simply end its interaction with the automation routine at stage 702. In some cases, unsuccessful local execution can be detected and indicated explicitly by the local automation system 220. In other cases, unsuccessful local execution may result from the local automation system 220 (e.g., a particular hub device 215 of the smart device mesh 110) being turned off, unavailable, malfunctioning, etc. In such cases, there may simply be no local execution without any explicit indication. If the determination at stage 724 is that the local execution of the automation routine was successful, the method 700 can continue at stage 728 by communicating an execution success message 356 from the local automation system 220 to the cloud-based automation system 135.

Concurrent with stages 716-728, the timer initiated in stage 748 continues to run at the cloud-based automation system 135, while the cloud-based automation system 135 waits to see whether the local automation system 220 will send the execution success message 356 at stage 728 prior to elapsing of a predetermined failover time by the timer 335. This is indicated by stages 752 and 756. At stage 752, a determination is made as to whether the execution success message 356 has been received. If not, a determination is made at stage 756 as to whether the predetermined failover time has elapsed on the timer 335. If not, the method 700 loops back to stage 752, and the cloud-based automation system 135 continues to wait. If, at some point prior to the predetermined failover time elapsing, the determination at stage 752 is that the execution success message 356 has been received, the method 700 exits the loop at stage 760. Receipt of the execution success message 356 indicates that the automation routine has already been successfully executed by the local automation system 220. Accordingly, at stage 760, embodiments can stop the timer 335 and prelude any execution of the automation routine by the cloud-based automation system 135 (i.e., stopping any further involvement of the cloud-based automation system 135 with the automation routine). In the event that it is determined, at stage 756, that the predetermined failover time has elapsed without the cloud-based automation system 135 receiving the execution success message 356, the method exits the loop by executing the automation routine at stage 744 (by the cloud-based executor 330).

Returning to FIG. 6, some embodiments of the method 600 can proceed at stage 620 by electing an executor hub device to perform the default execution of the automation routine. The electing can be part of the claiming 612 in some embodiments. For example, embodiments of the local automation system 220 can be implemented by multiple hub devices 215 of the same smart device mesh 110, each hub device 215 having an instance of a local automation service 225. In such embodiments, as described herein, different ones of the hub devices 215 can be more or less suited to locally executing different ones of the automation routines, and the electing at stage 620 involves choosing a most suited one of the hub devices 215 as the executor hub device. For example, a particular hub device 215 may be chosen because it is on a same sub-LAN as smart devices 115 that need to be controlled as part of executing the automation routine, because it has the most relevant capabilities for locally executing the automation routine, because it is the most powerful of all the hub devices 215 generally, because it has the most updated configuration (e.g., firmware, security features, etc.), and/or for any other suitable reason.

Some embodiments of the method 600 can further include, at stage 624, monitoring local execution success to determine whether to de-claim the automation routine. For example, after each execution of a locally claimed one of the automation routines, embodiments determine and log whether the automation routine was successfully executed by the local automation system 220, or whether failover execution by the cloud-based automation system 135 occurred. Over time, embodiments can determine, based on the logging, whether to de-claim the automation routine, so that it is no longer locally claimed. In some implementations, the automation routine is de-claimed when the number of unsuccessful local executions is above a predetermined threshold number, and/or above a predetermined frequency (e.g., occurrence per time window). In other implementations, computations are performed on the logged information to determine whether to de-claim an automation routine determine based on whether the likelihood of successful local execution is below a predetermined threshold level. In some embodiments, determining to de-claim an automation routine results in automatic de-claiming of the automation routine. In other embodiments, determining to de-claim an automation routine results in issuing an indication to a consumer recommending de-claiming of the automation routine, and de-claiming the automation routine only responsive to a consumer's subsequent indication to do so. In some embodiments, determining to de-claim an automation routine can cause the method 600 to return to stage 620 and attempt to re-elect a new executor hub device, where possible.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for selective local execution of automation routines in a smart device mesh having a local automation system and a plurality of devices disposed in a consumer premises and communicatively coupled with a cloud-based automation system, the method comprising:
obtaining, by the local automation system, an automation routine that defines control of at least a second device of the plurality of devices automatically in response to detection of an associated trigger condition by at least a first device of the plurality of devices;
determining, by the local automation system, that the automation routine is locally claimable, such that the automation routine is executable by the local automation system; and
claiming the automation routine by the local automation system responsive to determining that the automation routine is locally claimable, the claiming comprising tagging the automation routine as locally claimed both at the local automation system and at the cloud-based automation system, such that detection of the associated trigger condition by at least the first device causes a trigger message to be issued both to the local automation system and to the cloud-based automation system for default execution of the automation routine by the local automation system and for failover execution of the automation routine by the cloud-based automation system automatically in event of failure of the default execution.

2. The method of claim 1, further comprising, subsequent to the claiming:
receiving an indication at the local automation system of detection of the associated trigger condition by at least the first device;
initiating the default execution of the automation routine by the local automation system in response to the receiving the indication by attempting control of at least the second device in accordance with the automation routine; and
communicating an execution success message from the local automation system to the cloud-based automation system based on determining that the default execution of the automation routine is successful, the execution success message to direct precluding of the failover execution of the automation routine by the cloud-based automation system.

3. The method of claim 2, further comprising:
receiving the indication by both the local automation system and the cloud-based automation system;
initiating a timer by the cloud-based automation system responsive to receiving the indication by the cloud-based automation system;
determining whether the execution success message is received by the cloud-based automation system from the local automation system prior to the timer reaching a predetermined failover time; and
precluding the failover execution of the automation routine automatically responsive to determining that the execution success message is received from the local automation system prior to the timer reaching the predetermined failover time, or commencing the failover execution of the automation routine automatically responsive to determining that the execution success message is not received from the local automation system prior to the timer reaching the predetermined failover time.

4. The method of claim 1, wherein:
at least some of the plurality of devices are dual-connected devices that are communicatively coupled both with the cloud-based automation system and with the local automation system; and
determining that the automation routine is locally claimable comprises determining that both the first device and the second device are dual-connected devices.

5. The method of claim 1, wherein determining that the automation routine is locally claimable comprises determining that the local automation system is capable of controlling at least the second device in fulfillment of the automation routine.

6. The method of claim 1, wherein:
the local automation system is implemented by at least one hub device; and
at least some of the plurality of devices are communicatively coupled with the at least one hub device via a local area network (LAN) of the consumer premises.

7. The method of claim 6, wherein:
the local automation system is implemented by a plurality of hub devices; and
the claiming the automation routine by the local automation system comprises electing an executor hub device of the plurality of hub devices to perform the default execution of the automation routine.

8. The method of claim 7, wherein:
the LAN comprises a plurality of sub-LANs, each of the plurality of hub devices communicatively coupled with one or more of the sub-LANs; and
the electing comprises:
determining that the first device and the second device are communicatively coupled with a particular sub-LAN of the plurality of sub-LANs; and
determining the executor hub device as one of the plurality of hub devices that is communicatively coupled with the particular sub-LAN.

9. The method of claim 7, wherein:
each of the plurality of hub devices is associated with a respective feature configuration; and
the electing comprises:
determining one or more control features involved with executing the automation routine; and
determining the executor hub device as one of the plurality of hub devices for which the respective feature configuration is compatible with the one or more control features.

10. The method of claim 1, wherein the obtaining the automation routine by the local automation system comprises:
receiving the automation routine, by the cloud-based automation system from a user interface device via a portal application, the automation routine being expressed as processor-executable instructions generated by the portal application from user-specified automation parameters; and
receiving the automation routine by the local automation system from the cloud-based automation system responsive to the receiving the automation routine by the cloud-based automation system.

11. The method of claim 1, wherein:
the automation routine is stored as processor-executable instructions in a local manifest of the local automation system and in a cloud-based manifest of the cloud-based automation system, the processor-executable instructions comprising an execution trait that indicates whether the automation routine is locally claimed by the local automation system; and
the tagging the automation routine comprises updating the execution trait to indicate that the automation routine is locally claimed.

12. A smart device mesh automation system comprising:
a local automation system implemented by at least one hub device and comprising:
a first network interface to communicatively couple with a cloud-based automation system via a non-local network;
a second network interface to communicatively couple with a local area network (LAN) of a consumer premises, the smart device mesh automation system having a plurality of devices disposed in the consumer premises, the plurality of devices communicatively coupled with the cloud-based automation system, and at least a portion of the plurality of devices being dual-connected devices that are further communicatively coupled with the local automation system via the LAN;
one or more processors coupled with the first network interface and the second network interface; and
a non-transitory processor-readable memory having instructions stored thereon which, when executed, cause the one or more processors to execute steps comprising:
obtaining an automation routine that defines control of at least a second device of the plurality of devices automatically in response to detection of an associated trigger condition by at least a first device of the plurality of devices;
determining that the automation routine is locally claimable based at least one whether the first device and the second device are both dual-connected devices; and
claiming the automation routine by the local automation system responsive to determining that the automation routine is locally claimable, the claiming comprising tagging the automation routine as locally claimed both at the local automation system and at the cloud-based automation system, such that detection of the associated trigger condition by at least the first device causes an automation request to be issued both to the local automation system and to the cloud-based automation system for default execution of the automation routine by the local automation system and for failover execution of the automation routine by the cloud-based automation system automatically in event of failure of the default execution.

13. The smart device mesh automation system of claim 12, wherein the instructions, when executed, cause the one or more processors to execute steps further comprising, subsequent to the claiming:
attempting executing the automation routine by the local automation system in response to receiving an indication at the local automation system of detection of the associated trigger condition by at least the first device, the attempted executing comprising attempting control of at least the second device via the second network interface in accordance with the automation routine; and
communicating an execution success message from the local automation system to the cloud-based automation system via the first network interface if the default execution of the automation routine is determined to be successful, the execution success message directing precluding of the failover execution of the automation routine by the cloud-based automation system.

14. The smart device mesh automation system of claim 13, further comprising:
the cloud-based automation system configured to:

receive the indication by the cloud-based automation system substantially concurrently with the receiving the indication at the local automation system;

initiate a timer by the cloud-based automation system responsive to receiving the indication by the cloud-based automation system;

determine whether the execution success message is received from the local automation system prior to the timer reaching a predetermined failover time; and preclude execution of the automation routine by the cloud-based automation system responsive to determining that the execution success message is received, or execute the automation routine by the cloud-based automation system responsive to determining that the execution success message is not received.

15. The smart device mesh automation system of claim 14, wherein:

the cloud-based automation system is further configured to receive the automation routine from a user interface device via a portal application, the automation routine being expressed as processor-executable instructions generated by the portal application from user-specified automation parameters; and the step of obtaining the automation routine comprises receiving the automation routine from the cloud-based automation system responsive to the receiving the automation routine by the cloud-based automation system.

16. The smart device mesh automation system of claim 14, wherein:

the local automation system further comprises a local manifest to store the automation routine as processor-executable instructions comprising an execution trait that indicates whether the automation routine is locally claimed by the local automation system;

the cloud-based automation system comprises a cloud-based manifest to store the automation routine as the processor-executable instructions comprising the execution trait; and the tagging comprises updating the execution trait to indicate that the automation routine is locally claimed.

17. The smart device mesh automation system of claim 12, wherein:

the step of determining whether the automation routine is locally claimable further comprises determining whether the local automation system is capable of controlling the second device in fulfillment of the automation routine; and the claiming is only performed in response to determining both that the first device and the second device are both dual-connected devices, and that the local automation system is capable of controlling the second device as defined by the automation routine.

18. The smart device mesh automation system of claim 12, wherein:

the local automation system is implemented by a plurality of hub devices; and wherein the step of claiming comprises electing an executor hub device of the plurality of hub devices to perform the default execution of the automation routine.

19. The smart device mesh automation system of claim 18, wherein:

the LAN comprises a plurality of sub-LANs, each of the plurality of hub devices communicatively coupled with one or more of the sub-LANs; and the electing comprises:

determining that the first device and the second device are communicatively coupled with a particular sub-LAN of the plurality of sub-LANs; and determining the executor hub device as one of the plurality of hub devices that is communicatively coupled with the particular sub-LAN.

20. The smart device mesh automation system of claim 18, wherein:

each of the plurality of hub devices is associated with a respective feature configuration; and the electing comprises:

determining one or more control features involved with executing the automation routine; and determining the executor hub device as one of the plurality of hub devices for which the respective feature configuration is compatible with the one or more control features.

21. A method for selective local execution of automation routines in a smart device mesh having a plurality of devices disposed in a consumer premises and communicatively coupled with a cloud-based automation system via a non-local network, at least some of the plurality of devices being dual-connected devices that are further communicatively coupled with a local automation system via a local area network (LAN) of the consumer premises, the method comprising:

receiving, by the cloud-based automation system, a first indication of detection of a first trigger condition and a second indication of detection of a second trigger condition;

identifying a first automation routine as triggered by the first trigger condition and a second automation routine as triggered by the second trigger condition, the first and second automation routines previously stored in cloud-based storage of the cloud-based automation system;

determining that the first automation routine is tagged as locally claimed and that the second automation routine is not tagged as locally claimed;

responsive to the determining:

commencing execution of the second automation routine by the cloud-based automation system, responsive to the determining that the second automation routine is not tagged as locally claimed, by communicating control messages to one or more devices of the smart device mesh via the non-local network;

initiating a timer by the cloud-based automation system, responsive to the determining that the first automation routine is tagged as locally claimed;

determining whether an execution success message is received by the cloud-based automation system from the local automation system prior to the timer reaching a predetermined failover time, the execution success message indicating successful execution of the first automation routine by the local automation system; and precluding execution of the first automation routine by the cloud-based automation system responsive to determining that the execution success message is received, or executing the first automation routine by the cloud-based automation system responsive to determining that the execution success message is not received.

* * * * *